UNITED STATES PATENT OFFICE.

EDWARD R. HOLDEN, OF DENVER, COLORADO.

PROCESS OF PURIFYING HYPOSULPHITE LEACHING SOLUTIONS.

SPECIFICATION forming part of Letters Patent No. 471,550, dated March 29, 1892.

Application filed March 18, 1891. Serial No. 385,480. (No specimens.)

*To all whom it may concern:*

Be it known that I, EDWARD R. HOLDEN, of the city of Denver, in the county of Arapahoe and State of Colorado, have invented a certain new and useful Process of Purifying Hyposulphite Leaching Solutions, of which the following is a specification.

My invention relates to the method of extracting precious metals from their ores known as "lixiviation" or "leaching" by means of a hyposulphite solution, which is passed through the ore, whereby certain compounds of silver, gold, lead, and copper are dissolved and subsequently precipitated and separated; and it particularly relates to a process of purifying, reviving, or restoring the hyposulphite solution to the desired efficiency after it has been used and preparatory to re-using it, which is made necessary for the reasons to be hereinafter set forth.

In the ordinary process of leaching with a hyposulphite solution water is usually first poured on and allowed to filter through the mass of ore to dissolve out and remove all soluble salts therein which are formed in the roasting. After all such soluble salts have been washed out a solution of a hyposulphite, generally of sodium or calcium, is turned on and passed through the ore to dissolve and extract all the silver present as chloride of silver, together with any small amounts of gold, lead, copper, zinc, and other metals that may exist therein. This leaching process is repeated or continued until all the silver is dissolved or extracted, when the leaching with the hyposulphite solution is stopped, and the solution containing the extracts of silver and other metals is then conducted into vats or tanks and the silver is separated therefrom by precipitation, a solution of calcium or sodium sulphide being used therefor, which precipitates the silver as sulphide of silver, which is flocculent and can easily be separated either by filtration or decantation. After the hyposulphite solution has been passed through the ore and the extracted silver has been separated therefrom in the manner just stated it is used again on the same or on another mass of ore; but in passing the solution through the ore and in the precipitation of the silver by means of calcium or sodium sulphide, or even when treating a roasted ore containing lime, impurities are accumulated into the hyposulphite solution, which greatly interfere with the extraction of the silver when the solution is again used on the same or on another mass of ore, the most deleterious of such impurities being the hydrates of sodium, potassium, calcium, and magnesium. Hence when such solution is again used all the silver is not extracted or dissolved. It is necessary, therefore, to obtain the best results to restore the solution to its original or desired efficiency or to destroy or neutralize the impurities that have been dissolved or accumulated in it; and to accomplish this acids of all kinds have been introduced into the solution, as also sulphate of iron and other soluble compounds of iron which have an affinity for the extracted impurities and neutralize them, and the hyposulphite solution is then ready for subsequent use.

The above sets forth the ordinary methods which are now employed; but I have discovered that the use of a bisulphate of any base to purify and revive the hyposulphite solution accomplishes the desired results in equally as efficient a manner as with the use of soluble salts of iron or sulphuric or other acids.

In carrying out my process I preferably employ bisulphate of sodium, which I introduce into the hyposulphite solution either in solid form or in solution, and I add just enough to neutralize or destroy all the impurities, caustics, and hydrates present or until the solution has a slight acid reaction, after which the hyposulphite solution is again ready to be introduced into the ore to extract the silver, as before set forth. I mention the bisulphate of sodium particularly, as it is cheaper and more easily obtained and in greater quantities; but I do not limit my invention to the use of bisulphate of sodium, since the bisulphate of any base may be employed, as above stated, for the purposes set forth within the spirit of my invention, and therefore

What I claim as my invention, and desire to secure by Letters Patent, is—

1. In the art of leaching ores with hyposulphite solutions, the process of restoring such solutions after they have passed through the ores, which consists in adding thereto the bisulphate of any base, substantially as set forth.

2. In the art of leaching ores with hyposulphite solutions, wherein the solutions are used after the precipitation of metals therefrom, the process of removing or neutralizing deleterious impurities in said solutions, so as to restore them for subsequent use, which consists in adding to said solutions after use the bisulphate of sodium.

In testimony whereof I have signed my name to this specification the 14th day of March, A. D. 1891.

EDWARD R. HOLDEN.

In presence of—
   E. J. MATHEWS,
   R. T. GREEN.